(12) United States Patent
Sadler et al.

(10) Patent No.: US 6,810,309 B2
(45) Date of Patent: Oct. 26, 2004

(54) VEHICLE PERSONALIZATION VIA BIOMETRIC IDENTIFICATION

(75) Inventors: John G. Sadler, South Lyon, MI (US); Adrian Madau, Dearborn, MI (US); Thomas A. Gioia, Plymouth, MI (US); Eric M. Heussner, Canton, MI (US); David D. Chi, Birmingham, MI (US); Ryan L. Templeton, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/411,553

(22) Filed: Apr. 10, 2003

(65) Prior Publication Data

US 2003/0204290 A1 Oct. 30, 2003

Related U.S. Application Data

(60) Provisional application No. 60/375,761, filed on Apr. 25, 2002.

(51) Int. Cl.[7] .............................................. G06F 7/00
(52) U.S. Cl. ........................................................ 701/1
(58) Field of Search ........................ 701/1; 340/426.1, 340/500, 5.52–5.54, 5.72, 5.8–5.82

(56) References Cited

U.S. PATENT DOCUMENTS 6,198,996 B1    3/2001   Berstis 6,271,745 B1    8/2001   Anzai et al.
2002/0097145 A1 * 7/2002 Tumey et al. ................ 340/426

FOREIGN PATENT DOCUMENTS

| EP | 0 924 123 | 6/1999 |
|---|---|---|
| EP | 1 031 479 | 8/2000 |
| EP | 1 113 405 | 7/2001 |
| EP | 1 293 403 | 3/2003 |
| GB | 2 340 975 | 3/2000 |
| GB | 2 349 257 | 10/2000 |

* cited by examiner

Primary Examiner—Yonel Beaulieu
(74) Attorney, Agent, or Firm—Brinks Hofer Gilson & Lione

(57) ABSTRACT

A system and method for detecting an identity of an occupant of a vehicle is disclosed. The system includes a sensor module mounted in a vehicle. The sensor module having an occupant sensor for acquiring an image of a member of the vehicle occupant to identify the vehicle occupant. The method includes activating a vehicle occupant identification system, acquiring an image of a member of the vehicle occupant, comparing the acquired image of the member with at least one stored image of a member, determining whether the acquired image of the member matches the at least one stored image, and assessing whether the vehicle occupant has been identified.

17 Claims, 8 Drawing Sheets

VEHICLE PERSONALIZATION VIA BIOMETRIC IDENTIFICATION

This application claims the benefit of provisional application No. 60/375,761, filed Apr. 25, 2002.

TECHNICAL FIELD

This invention relates generally to systems and methods for determining a person's identity, and more specifically to an improved system and method for identifying a user of a vehicle.

BACKGROUND

Currently, vehicle security is based upon keys or key codes. For example, the user is required to use a key to start the engine or access secure compartments such as the trunk or glove compartment. Also, keys are used to differentiate differing levels of access such as a valet key or a high performance key for sport cards.

Another problem is in the area of convenience. Users are required to manually adjust vehicle settings to their comfort level. These settings can be changed by other users and then the original user is required to re-adjust the vehicle. Prior systems have tried to store the "pre-sets" in memory and recalled with a push button. However, even the push button is a manual process and is prone to user error when the wrong button is pressed or the wrong settings stored.

Therefore, there exists a need for a new and improved system and method for identifying a vehicle occupant. The new and improved system and method should utilize a sensor capable of detecting the optical properties of a person's skin and underlying tissue structure. The differing optical properties are due to the unique layer, structure, density and chemical composition of a person's tissue. The system and method should be capable of functioning at any selected skin location.

SUMMARY

In an aspect of the present invention a biometric identification system for detecting the identity of a vehicle occupant is provided. The system positively identifies an occupant and associates a customized user profile with the occupant. The system would attempt to match the occupant with the profile of an authorized user. Upon successful identification, the occupant may start the vehicle, access secure compartments and access other vehicle features without the need of a key or other physical token. In addition, once the user profile has been recalled, the vehicle will automatically restore the pre-sets of vehicle applications to those values associated with the user profile. For example, upon positive identification and matching of driver A, the profile for A is recalled to allow access to the engine, email, doors etc. In addition, the radio, mirrors, seats and climate control system would be adjusted to the preferences set in the user profile (i.e. driver A).

In another aspect of the present invention, a method for detecting an identity of an occupant of a vehicle is provided. The method includes activating a vehicle occupant identification system, acquiring an image (or spectroscopic template) of a member of the vehicle occupant, comparing the acquired image of the member with at least one stored image of a member, determining whether the acquired image of the member matches the at least one stored image, and assessing whether the vehicle occupant has been identified.

In yet another aspect of the present invention, a system for detecting an identity of an occupant of a vehicle is provided. The system includes a module and a processor in communication with the module. The module is mounted in the vehicle. The module includes a biometric sensor and a first tactile switch. The biometric sensor is mounted in the module for acquiring an image of a member of the vehicle occupant. The first tactile switch is in communication with the biometric sensor for sensing the presence of the member of the vehicle occupant on the biometric sensor. The processor is in communication with the module for analyzing the image of the member of the vehicle occupant to determine the identity of the occupant.

Some of the benefits of using spectroscopy as a biometric is that the sensors are small LED sensors that can be packaged in a variety of locations, and provide a reduced processing power (calculations are less complex than in systems using other biometrics). Initial studies show improved accuracy compared to current biometrics, any skin surface can be used, population differences are not an issue and surface effects are minimized, reducing the impact of contaminates on the skin.

These and other aspects and advantages of the present invention will become apparent upon reading the following detailed description of the invention in combination with the accompanying drawings.

DETAILED DESCRIPTION

Figure 1:
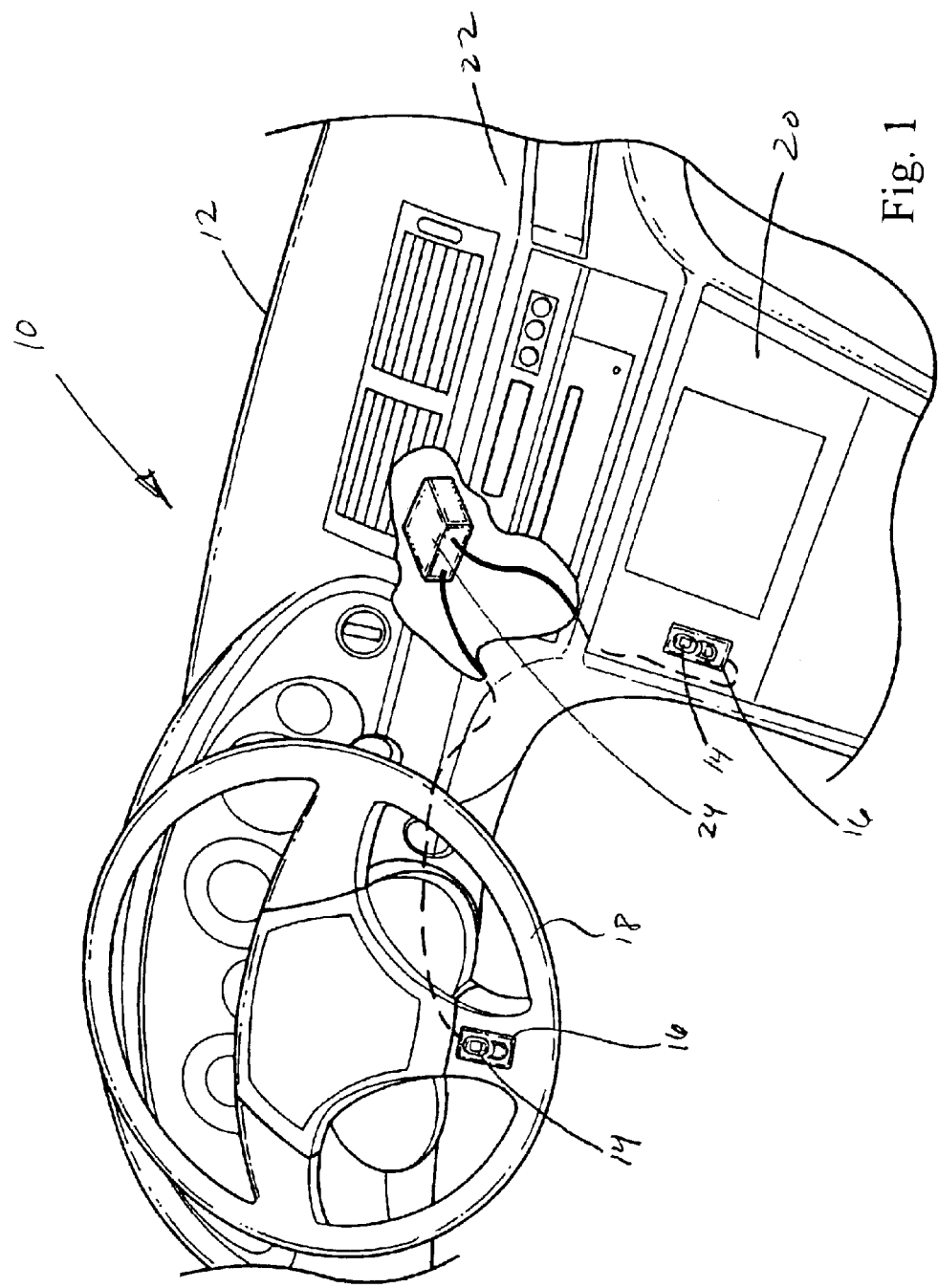
FIG. 1 is a diagrammatic illustration of the biometric identification system implemented in a vehicle, in accordance with the present invention.

With reference to FIG. 1, a biometric identification system (BIS) 10 for use in an automobile 12 (shown only as a partial interior view) is illustrated. BIS 10 includes a biometric sensor 14 mountable in a sensor module 16. Biometric sensor 14 may be any sensor that is capable of detecting the properties and characteristics of an occupant's skin. For example, the LightPrint™ sensor offered by Lumidigm, Inc.

of 800 Bradbury SE, Suite 213, Albuquerque, N.Mex. 87106 is such a biometric sensor 14. Lumidigm's proprietary human identification technology uses light spectroscopy to measure skin differences.

Sensor module 16 may be mounted in various locations within a passenger compartment of automobile 12. For example, sensor module 16 may be mounted to a steering wheel 18 or to a center console 20 of a vehicle instrument panel 22. BIS 10 further includes and electronic control module 24, in communication with biometric sensor 10. Control Module 24 contains the necessary electronics to process identification data received from biometric sensor 10. For example, electronic control module 24 may have control and processing circuitry, including microprocessors and electronic memory chips such as EEPROM or the like, for storing and executing program code capable of carrying-out biometric identification. In an embodiment of the present invention, electronic control module 24 may be located remotely from sensor module 16, such as in instrument panel 22, as shown in FIG. 1.

Figure 2:
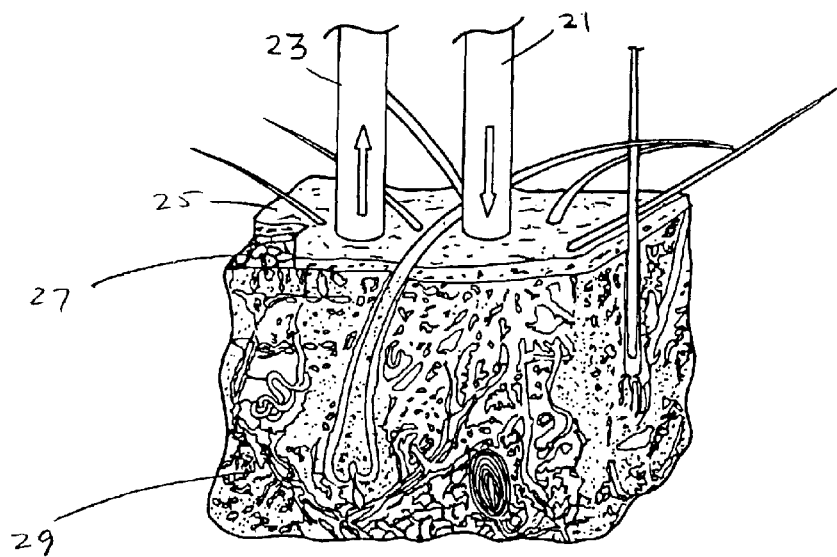
FIG. 2 is an illustrating depicting human skin and illustrating how light is absorbed, scattered and reflected after the light enters the skin and reaches various components and/or skin organs over layers, in accordance with the present invention.

BIS 10 utilizes visible light spectroscopy to identify vehicle occupants by their subcutaneous chemical composition, as well as skin structure by passing light 21 through the first three skin layers (epidermis 25, dermis 27 and hypodermis 29), as shown in FIG. 2. BIS 10 analyzes reflected light 23 to identify a vehicle occupant. For example, the LightPrint™ sensor illuminates a small (6 mm) patch of skin with a beam of visible and near-infrared light. The light is then measured after being scattered by the skin. These measurements are analyzed using propriety algorithms to extract a distinct optical pattern for each vehicle occupant. A vehicle occupant's Identification is confirmed by comparing their pattern/profile to patterns/profiles on record. Once the identity of an occupant has been determined, a user profile can be recalled to enable a variety of identity based automotive applications. Thus, the present invention contemplates using BIS 10 with applications that require the positive identification of vehicle occupants. Reflected light shows the effect of the following tissue characteristics, which vary by individual tissue: hydration, scattering properties due to collagen density, orientation, sex and age related differences in composition of the skin, thickness of skin layers, optical path-length differences, and volume fraction of blood.

Using different wavelengths provides information about identify: absorbance differences, and scattering differences. Spectroscopy refers to the measurement of light at different wavelengths (colors) before and after the light interacts with matter. A spectrum is a graph that shows the change in each wavelength. Each person has a different characteristic spectrum due to the unique biochemical and structural composition of human skin. An individual's characteristic skin spectrum can be revealed through analysis of tissue spectra using sophisticated mathematical analysis. This scientific observation is the basis for the LightPrint™ technology.

Skin is a complex organ comprised of multiple layers, a mixture of biochemicals, and structures such as follicles, sweat glands, and capillary beds. While everyone has skin, the exact composition of all of the elements of the skin varies between people. For example, skin layers differ in thickness, the interfaces between the layers have different undulations, pigmentation varies between people, collagen fibers and other proteins differ in density, and the capillary beds have distinct densities and locations beneath the skin. These characteristics, as well as other skin differences and the optical effects they produce, are a key component of the LightPrint™ technology.

LightPrint's™ optical sensor is built using common, low costs, solid-state electro-optical components and manufacturing technology. The back-end processing and memory requirements are modest. The result: an inexpensive, low-power unit appropriate for almost any biometric product application.

Because LightPrint™ analyzes light reflected from deep below the skin's surface, it's nearly impossible to observe and replicate someone's LightPrint™ signal. Additionally, synthetic, non-human, and amputated tissue have optical signals that are different from living human tissue and can't be used to foil the system. LightPrint™ is one of the most secure alternatives for identify authorization.

LightPrint™ can work with whatever skin area is best suited to the product application. The sensor can be designed with curves and other features to fit the use in an intuitive way. The image is converted to a mathematical model, and the model is matched against stored user models (templates). Authorized users would store mathematical models of their lightprints in the memory of the BIS for future verification. A successful match enables the user to access identity sensitive features. A failed match results in reduced or disabled features.

Figure 3:
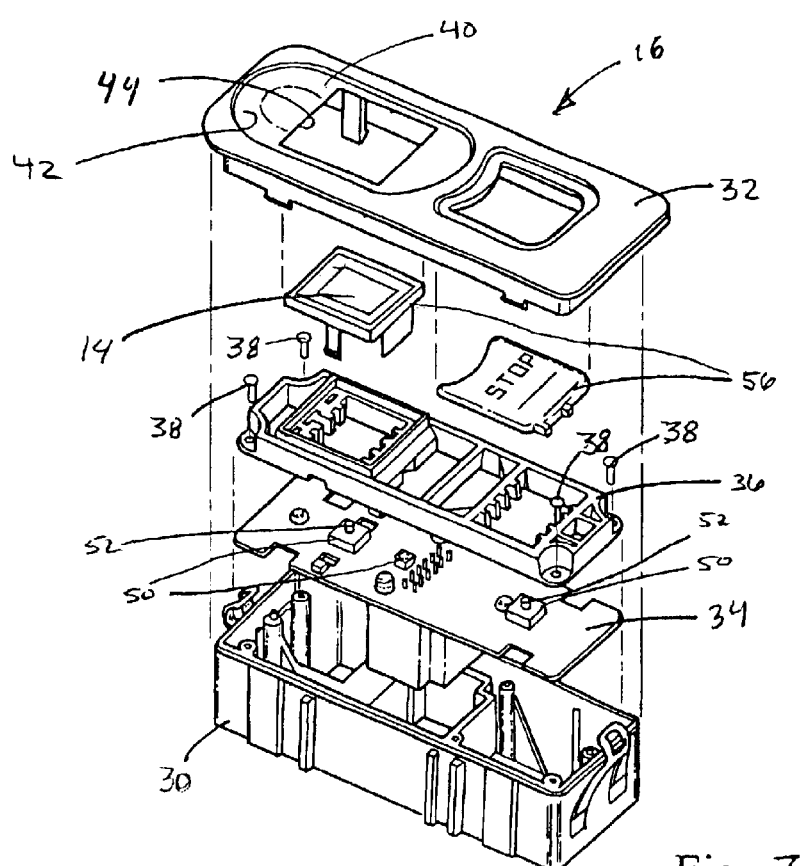
FIG. 3 is an exploded view of a sensor module having a biometric sensor that is capable of emitting and detecting reflected light after the light has passed through skin tissue, in accordance with the present invention.

In an embodiment of the present invention sensor module 16, as illustrated in an exploded view in FIG. 3, includes a housing 30 mountable to a vehicle interior. Sensor module 16 maybe mounted in a variety of locations within the vehicle interior, as described above. Housing 30 cooperatively mates with a top plate or bezel 32 to form an enclosure. A PWB 34 is mounted to housing 30 and is in electrical communication with biometric sensor 14. Biometric sensor 14 is secured and held in place on PWB 34 by a retainer or backer plate 36. Retainer 36 is attached to housing 30 using screws 38 or the like that extend through PWB 34 and into housing 30.

Preferably, an area 40 around biometric sensor 14, in bezel 32, is illuminated so as to allow a vehicle occupant to locate sensor 14 in the dark. Moreover, area 40 around biometric sensor 14 should have a raised wall 42 (for example, about 1.5 mm thick) surrounding a cutout 44 in bezel 32.

Light emitting diodes (LEDs) mounted on the PWB 34 will provide illumination of bezel 32. The exact number and layout of the LEDs is based upon ray tracing studies, as known by those of ordinary skill in the art to insure appropriate illumination. The illumination color is preferably yellow.

Preferably, three tactile rubber switches 50 having electrically conductive carbon pills 52 on the underside of a feature of revolution. The feature of revolution, for example, buckles under 300 grams peak force. In operation, as the feature of revolution collapses, the carbon pill makes physical contact with traces on PWB 34, thereby completing an electrical circuit. Buttons 56 mounted above switches 50 will push the switches down to make electrical contact. Switches 50 may be, for example, incorporated into a single 1 mm thick switch mat, which will be mounted flush on PWB 34. The peak force of these switches should be 300 grams and the travel should be 2 mm, to make the contact.

Preferably, two of switches 50 will be activated by a rocker button (not shown), which is hinged in the center. A third button 56 hinged to its aft end activates the third switch. The rocker button will perform the START function (if pressed down at the front end) and ACCESSORIES/PROGRAM function (if pressed down at the aft end). The third button 56 will perform the STOP function when depressed. The push buttons are made of clear polycarbonate, painted white and then black. The black color is laser-etched where the artwork/lettering appears, to let the backlight through. The pushbutton hinge rotates back and forth between corresponding hinge supports on bezel 32 and the backer plate.

On each side of the buttons, there is approximately a 0.5 mm gap between the push buttons and bezel 32 openings. On the front and back, there is a clearance sufficient enough to allow button movement without any possibility of interference even when parts are at their maximum material condition. The top surface of the buttons are slightly below the surface of bezel 32, to avoid their getting pushed down accidentally. The buttons should be located at such a point (in the vertical direction) that there is 0.2 mm depression of the switches underneath, in the normal, non-depressed condition. This preload is necessary to eliminate potential rattle between the switch and surrounding parts. There should be a positive stop on the underside of the push button (a feature) which contacts PWB 34 surface about 1 mm after the switch makes electrical contact.

The letters/artwork on the push buttons may be backlit with the help of yellow LEDs on PWB 34. The level of intensity for this illumination should be at least 1 foot-Lambert. The push buttons should be backlit but there should not be light bleeding from the gap around the buttons.

Retainer or backer plate 36, made of clear polycarbonate serves the function of illuminating biometric sensor 14. It will also serve the function of providing support to the rocking push buttons. Biometric sensor 14 is sandwiched between bezel 32 and retainer 36 to retain the sensor. The retainer 36 is in turn sandwiched between populated PWB 34 and bezel 32. At least six M2.2 threaded self-tapping screws, for example, may be used to attach retainer 36 to PWB 34 and to bezel 32. Corresponding locating features and bosses are provided on related components. An ABS lower cover preferably is fastened to the bezel directly, with the help of at least 4 M3 threaded self-tapping screws.

Sensor module 16 is mounted with biometric sensor 14 facing vertically up (connector pointed vertically down). Module 16 has, preferably, at least three mounting tabs for fastening to a metallic or a strong polymeric structure in the vehicle. A clearance hole is provided in each mounting tab and there is either a corresponding extruded hole in the metallic mounting structure or a U-Nut in the metallic mounting structure. If the mounting structure is polymeric, then there are, preferably, threaded inserts corresponding to the clearance holes in the mounting tabs.

The visible surfaces of sensor module 16 (mainly the upper surface of bezel 32) should have a color that matches the color of the upholstery or a color that will harmonize with the coloring/styling scheme.

Referring now to FIGS. 4 through 9, methods for utilizing BIS 10 within a vehicle environment are illustrated in flowchart form, in accordance with an aspect of the present invention. As an overview BIS 10 would, generally, operate as follows: a new user enrolls into the biometric identification system by storing his biometric identity template (for example a light-print or chemical identification parameters) in the memory of the system. The identity template is associated with a user profile that contains the user's personalization data. The personalization data could be entered at the time of enrollment or at any time in which the user has been positively identified and the vehicle is personalized via a change in some adjustable setting e.g. radio preset, seat position, climate control. The newly enrolled user is now an authorized user. A previously enrolled user presents himself for identification and upon successful identification, the user profile is recalled. The appropriate vehicle applications are then reconfigured to the previously stored parameters. Changes made to the vehicle environment after initial identification would automatically update the user profile.

Figure 4:
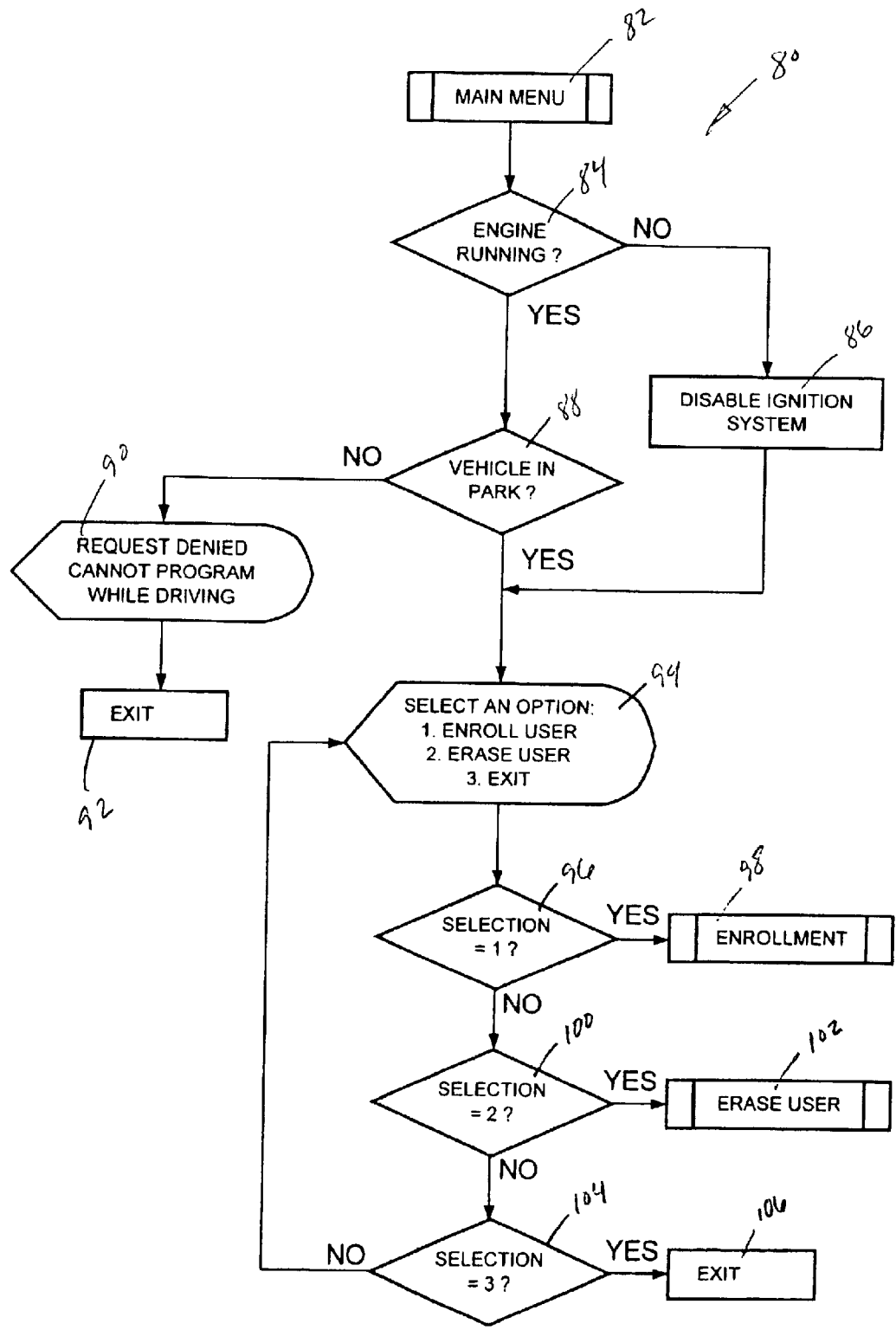
FIG. 4 is a flow diagram illustrating the method for using the biometric identification system, in accordance with the present invention.

Referring now to FIG. 4, a method 80 for accessing a main menu of system 10 is illustrated in flowchart form. The main menu provides enrollment and deletion functions for the biometric identification system 10. At block 82, a main menu is accessed by a system user. At block 84 an engine running determination is made. If the engine is not running, at block 86, the ignition system is disabled. If the engine is running, at block 88, a determination of whether the vehicle is in park is made. If the vehicle is not found to be in park, then at block 90 the user is notified that the request is denied because programming may not be accomplished while driving. Thereafter, the user exits the system, as represented by block 92.

If, however, it is determined at block 88 that the vehicle is in park, a user is prompted to select one of the following options: enroll a user (option one), erase a user (option two) or exit (option three), as represented by block 94. At block 96, a determination of whether option one was selected is made. If option one was selected, than at block 98 a routine for enrolling a user is entered (which will be described hereinafter). If option one was not selected, than at block 100 a determination of whether option two was selected is made. If option two was selected, than at block 102 an erase user routine is entered (which will be described hereinafter). However, if option two was not selected at block 104, a determination is made whether option three has been selected. If option three was not selected, then the user is prompted to make a selection, as represented by block 94. If option three was selected, the user exits the system, as represented by block 106.

Figure 5:
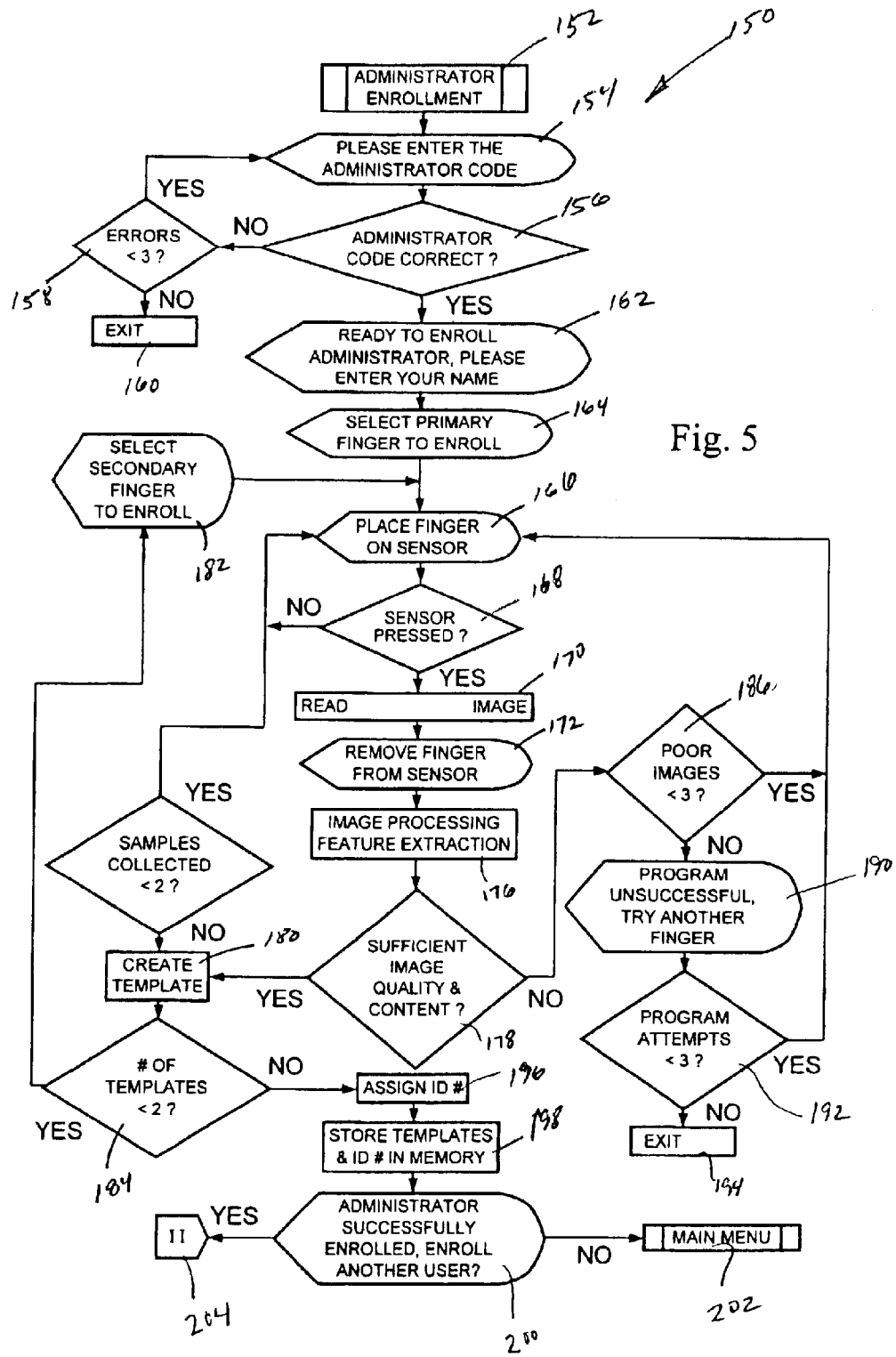
FIG. 5 is a flow chart illustrating method for enrolling an administrator in the biometric identification system, in accordance with the present invention.

Referring now to FIG. 5, an administrator enrollment process 150 is illustrated in flowchart form, in accordance with the present invention. Administrator enrollment is initiated at block 152. At block 154, a user is prompted to enter an administrator code. At block 156, a determination as to whether the administrator code is correct is made. If the administrator code is not correct, than at block 158, a determination of whether there has been less than three errors is made. If more than three errors have been made, then the user exits the system, as represented by block 160. If less than three errors have been made, than the user again is prompted to enter the administrator code, as represented by block 154.

However, if the administrator code is correct, than the user is prompted that the system is ready to enroll the administrator and that the user should enter their name, as represented by block 162. At block 164, the user is prompted to select the primary finger (or other biometrically identifiable member) to enroll.

At block 166, the user is prompted to place their finger on the biometric sensor. At block 168, a determination is made as to whether the biometric sensor was pressed. If it is determined that the sensor was not pressed, then the request is again made to the user to place their finger on the sensor, as represented by block 166. However, if the sensor was pressed, then the sensor reads the user's fingerprint image, at block 170. At block 172, the user is prompted to remove their finger form the sensor. At block 176, the system processes the image and undergoes feature extraction.

At block 178, a determination is made as to whether the image is of sufficient quality and content. If the image is of sufficient quality and content, then a template is created, at block 180. If the number of templates created is less than two, for example, then the user is prompted to select a secondary finger to enroll, as represented by blocks 182 and 184. However, if at block 178 the image is not of sufficient quality and content then, at block 186, a determination as to whether there has been less than three poor images acquired is made, as represented by block 186. If less than three poor images have been acquired, the user is prompted to place a finger on the sensor, as represented by block 166. However, if the number of poor images is greater than three, then at block 190 the user is prompted that the program is unsuccessful, try another finger. At block 192, a determination is made as to whether the programming attempts are less than three. If the programming attempts were less than three, then the user is prompted to place their finger on the sensor, as represented by block 166. If however, the program attempts are greater than three, the user exits the system at block 194.

If, however, at block 178 sufficient image quality and content is achieved and a template is made at block 180 and the number of templates is not less than two, as determined at block 184, then the template is assigned an ID number at block 196. At block 198, the templates and ID numbers are stored in memory.

At block 200, the user is prompted that the administrator has been successfully enrolled and the user is questioned as to whether another user is to be enrolled. If no other user is to be enrolled, then the system returns to the main menu (method 80 illustrated in FIG. 4), as represented by block 202. However, if the user has selected to enroll another user, then as indicated by block 204, the system enters a routine 250 for enrolling an additional user of the system (shown in FIG. 6).

Figure 6:
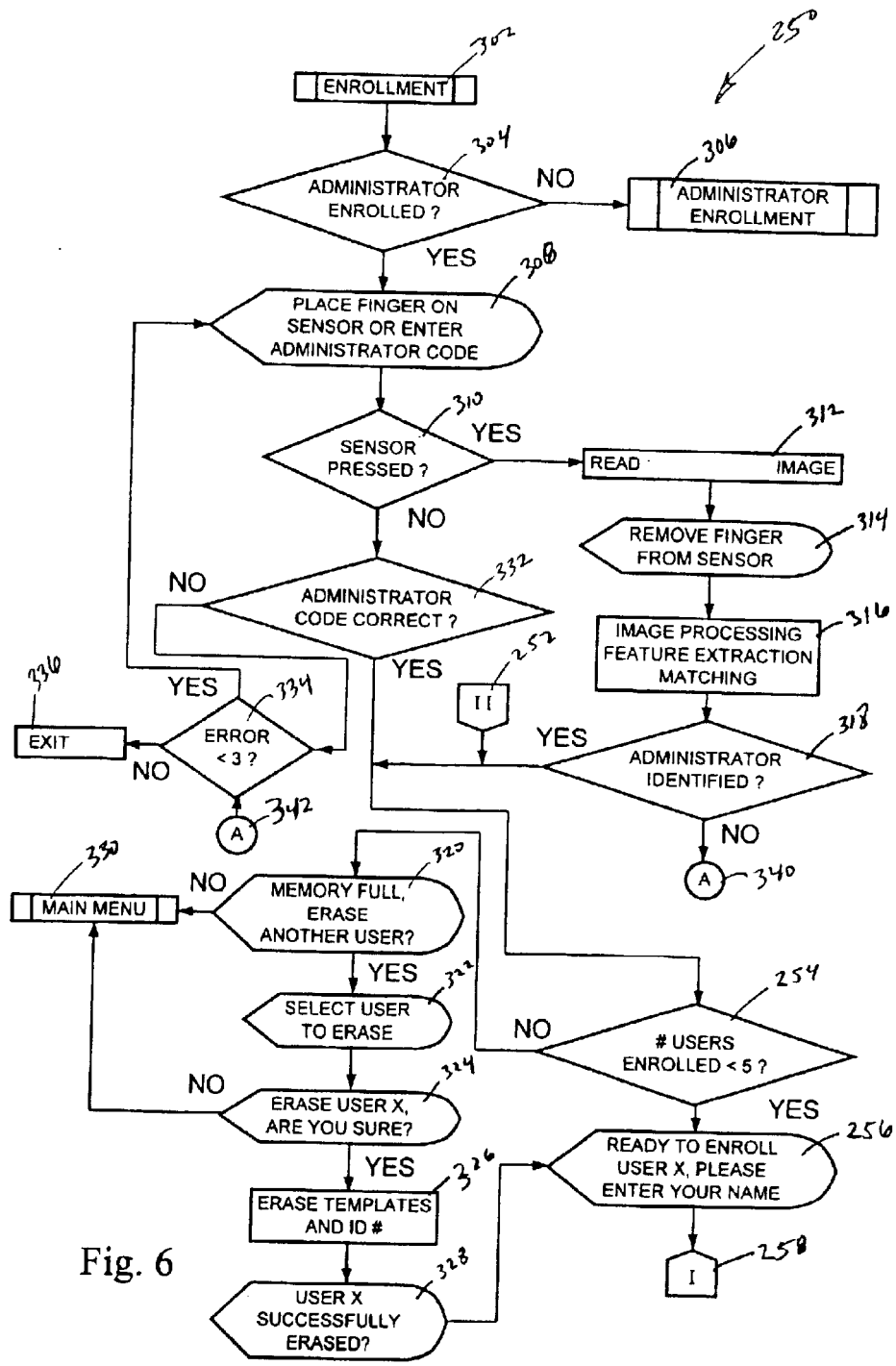
FIG. 6 is a flow chart illustrating the enrollment process for enrolling a user of the biometric identification system, in accordance with the present invention.

With reference to FIG. 6, a determination of whether the number of users is less than five is made, as indicated by blocks 252 and 254. If less than five users have been enrolled, then the user is prompted that the system is ready to enroll the user and that user should now enter their name, as represented by block 256. The enrollment process continues, as indicated by blocks 258 and 260, in FIG. 7.

Figure 7:
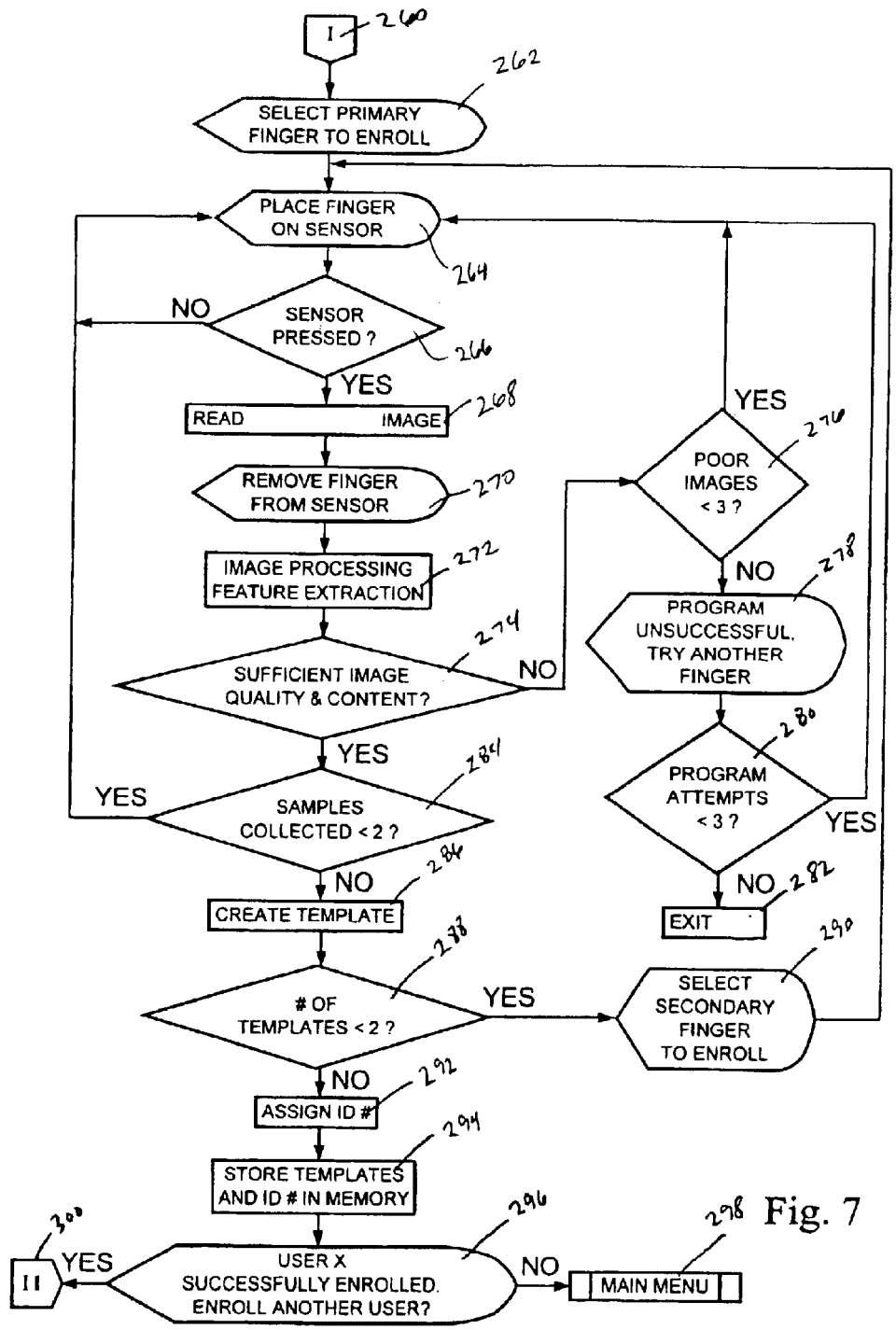
FIG. 7 is a flow chart illustrating the continuation of the enrollment process of FIG. 6.

Referring now to FIG. 7, a continuation of enrollment process 250 is illustrated. At block 262, the user is prompted to select a primary finger (or other biometrically identifiable member) to enroll. At block 264, the user is prompted to place their finger on the sensor. At block 266, a determination is made as to whether the sensor was pressed. If the sensor was not pressed, the user is again prompted to place their finger on the sensor. If the sensor was pressed, the system reads the fingerprint image, at block 268. At block 270, the user is prompted to remove their finger from the sensor. Image processing and feature extraction is accomplished thereafter, as represented by block 272. At block 274, a determination is made as to whether sufficient image quality and content has been achieved. If the image quality and content is not sufficient, then at block 276, a determination is made as to whether the number of poor images is less than three, for example. If the number of poor images is less than three, then the user is prompted to place their finger on the sensor, as represented by block 264. If the number of poor images is not less than three, the user is prompted, at block 278, that programming is unsuccessful and that they should try another finger. At block 280, it is determined whether the program attempts have been less than three. If program attempts have been less than three, then the user is requested to place their finger on the sensor, as represented by block 264. If the number of program attempts is not less than three, then at block 282, the user exits the system.

If however, at block 274 it is determined that the image quality and content is sufficient, then a determination is made as to whether the number of samples collected is less than two, as represented by block 284. If the number of samples collected is less than two, then the user is prompted to place their finger on the sensor, as represented by block 264. If however the number of samples collected is not less than two, then a template is created at block 286. At block 288, a determination is made as to whether the number of templates created is less than two. If the number of templates created is less than two, the user is prompted, at block 290 to select a secondary finger to enroll and the process of enrolling that finger continues, at block 264. If the number of templates is not less than two, then at block 292, an ID number is assigned to the template. At block 294 the template(s) and associated ID number are stored in system memory. At block 296, the user is prompted that they have been successfully enrolled and question as to whether another user is to be enrolled. If no other user is to be enrolled, the system returns to the main menu (as illustrated in FIG. 4), as represented by block 298. If another user is to be enrolled, then the system returns to FIG. 6, block 252, as represented by block 300 of FIG. 7.

Returning now to FIG. 6, enrollment process 250 will now be further described, in the case when a user selects enrollment rather than administrator enrollment. Enrollment is initiated at block 302. At block 304, determination is made as to whether an administrator has been enrolled. If an administrator has not been enrolled, then at block 306 an administrator enrollment process is entered (as illustrated in FIG. 5). If an administrator has been enrolled, then at block 308 the user is prompted to place their finger (or other biometrically identifiable member) on the sensor or enter an administrator code. At block 310, a determination is made as to whether the sensor has been pressed. If the sensor has been pressed, then at block 312 the fingerprint image is read. At block 314, the user is prompted to remove their finger from the sensor. At block 316, image processing and feature extraction matching is undertaken. At block 318, a determination of whether the administrator has been identified is made. If the administrator has been identified, then at block 254 a determination is made as to whether the number of users enrolled is less than five, for example. If the number of users enrolled is not less than five, then at block 320 the user is prompted that the memory is full and whether the user would like to erase another user. If the user would like to erase another user at block 322, the user is prompted to select the user to erase. At block 324, the user is prompted as to whether the selected user is really the user to be erased. If the user indicates that they are sure of the user to be erased, then at block 326 the templates and ID number are erased for that user. At block 328 the system prompts that the user has been successfully erased. However, at block 324 if the user indicates that they are not sure of the user to be erased, the system returns to the main menu, as represented by block 330.

If at block 310 the sensor has not been pressed, a determination is made as to whether the administrator code is correct, at block 332. If the administrator code is not correct, a determination is made, at block 334, as to the number of errors that have occurred. If the number of errors is less than three, then the user is prompted to place their finger on the sensor or enter the administrator code, as represented by block 308. If the number of errors is greater than three, then the user exits the system, as represented by block 336.

If at block 318 the administrator has not been identified, then as indicated by block 340 and 342, a determination is made as to the number of errors, as represented by block 334.

Figure 8:
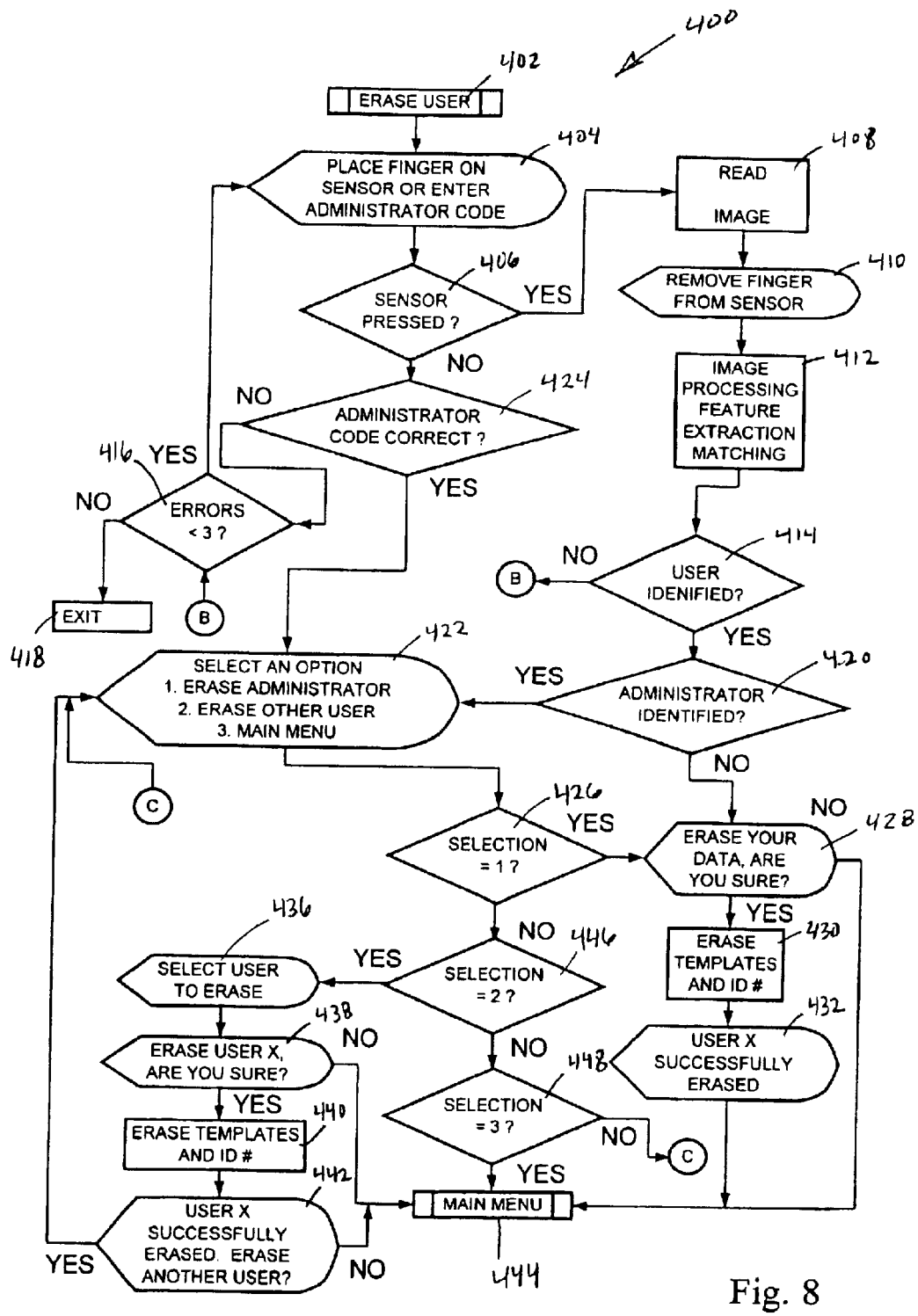
FIG. 8 is a flow chart illustrating a process for erasing a user from the biometric identification system, in accordance with the present invention.

Referring now to FIG. 8, a flow chart illustrating a process 400 for erasing a user of system 10 is illustrated, in accordance with the present invention. Process 400 for erasing a user of system 10 is initiated, at block 402. At block 404, a user is prompted to place their finger (or other biometrically identifiable member) on the sensor or enter an administrator code. At block 406, a determination is made as to whether the sensor has been pressed. If the sensor has been pressed then at block 408, the fingerprint image is read. The user is then prompted to remove their finger from the sensor, as represented by block 410. Image processing and feature extraction matching is conducted, at block 412. A determination as to whether the user has been identified is made, at block 414. If the user has not been identified, a determination of the number of errors that have occurred is made at block 416. If the number of errors made are not less than three, then the user exits the system, as represented by block 418. If, however, at block 416, it is determined that the number of errors is less than three, the user is again prompted to place their finger on the sensor or enter it an administrator code, as represented by block 404.

If, however, the user has been identified at block 414, at block 420 a determination is made as to whether the administrator has been identified. If the administrator has been identified, then the user is prompted at block 422, to select one of the following options: (1) erase administrator; (2) erase other user; and (3) main menu. Block 422, is also reached if at block 406 the sensor has not been pressed and if at block 424 it is determined that the administrator code is correct. However, if the administrator code is not correct, then a determination is made, at block 416 whether the number of errors is less than three. However, if the administrator code is correct, then the user is prompted as described above with respect to block 422. At block 426, a determination is made as to whether a user has selected option (1) of block 422. If a user has selected option (1), then the user is prompted to erase their data and also whether they are sure they want to erase their data, as represented by block 428. If the user responds affirmatively, then the template(s) and ID number are erased, as represented by block 430. At block 432, the user is prompted that a user has been successfully erased.

If at block 426 the user has not selection option (1), then at block 446 a determination is made as to whether option (2) has been selected. If option (2) has been selected, the user is prompted to select a user to erase, at block 436. At block 438, the user is prompted to determine whether the user is sure that the selected user is to be erased. If the user is sure, then at block 440, the templates corresponding to that user as well as ID numbers are erased. At block 442, the user is prompted that the selected user has been erased and whether another user should be erased. If another user is to be erased, then the process repeats itself starting at block 422. If no other user is to be erased, then the system returns to the main menu, as represented by block 444.

However, if at block 446 a determination is made that selection (2) was not selected, then at block 444 a determination is made as to whether option (3) has been selected. If option (3) has been selected then the system returns to the main menu, as represented by block 444. If however, option (3) has not been selected, the system returns to block 422 where the user is prompted to select one of the three options.

Figure 9:
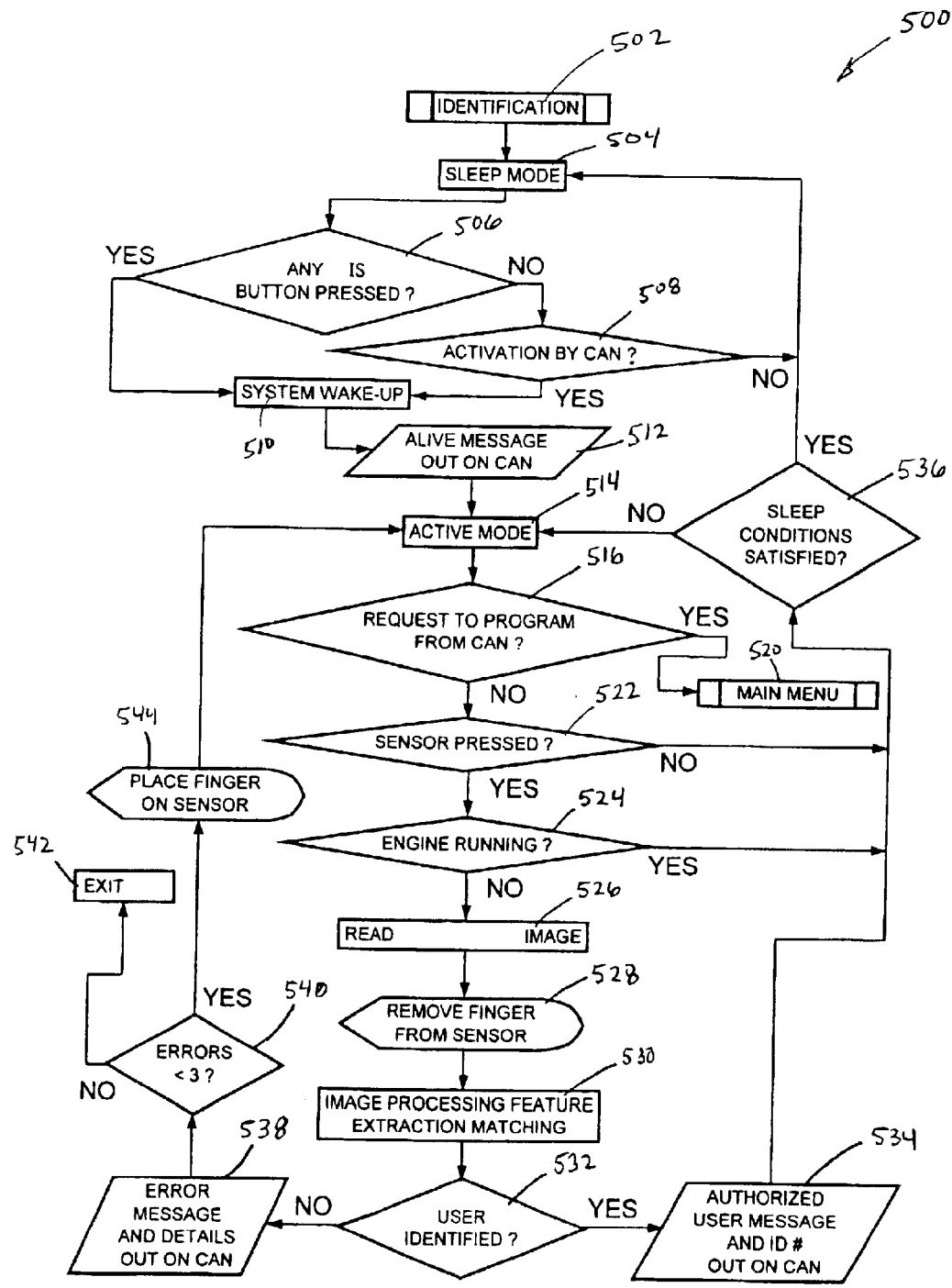
FIG. 9 is a flow chart illustrating a user identification process for identifying a user of the biometric identification system, in accordance with the present invention.

Referring now to FIG. 9, a process 500 for identifying and verifying a user of system 10 is illustrated in flowchart form, in accordance with the present invention. The identification process is initiated at block 502. At block 504, the system is in a sleep mode. At block 506, a determination is made as to whether any button of the system has been pressed. If no button has been pressed, a determination as to whether activation by CAN (Controller Area Network) has been made, as represented by block 508. If either a button is pressed or the system is activated by CAN, the system wakes up, as represented by block 510. At block 512 an alive message is sent out over the CAN. The system now enters active mode, as represented by block 514. At block 516, a determination as to whether there is a request to program from the CAN is made, as represented by block 516. If there is a request to program from the CAN, then the system returns to the main menu (see FIG. 4), as indicated by block 520. If a request to program from the CAN is not received, then at block 522 a determination as to whether a sensor has been pressed is made. If a sensor has been pressed, then at block 524, a determination is made as to whether the engine is running is made. If the engine is not running, then at block 526, the fingerprint image is read. At block 528, the user is prompted to remove their finger (or other biometrically identifiable member) from the sensor. At block 530, image processing and feature extraction matching is accomplished.

At block 532, it is determined whether the user has been identified. If the user has been identified, an authorized user message and ID number is sent out over the CAN, as represented by block 534. At block 536, a determination is made as to whether sleep conditions are satisfied. If the sleep conditions are satisfied, then the system re-enters the sleep mode, as represented by block 504. If however sleep conditions are not satisfied, then the system stays in active mode, as represented by block 514.

If however the user is not identified at block 532, an error message including details is sent out over the CAN network, as represented by block 538. At block 540, a determination as to whether the number of errors is greater than three is made. If more than three errors have been made, then the system exits the identification routine, as represented by block 542. If however there has been less than three errors made then, at block 544, the user is prompted to place their finger on the sensor and the process repeats itself at block 514.

Applications that may be enabled by system 10 include: modification of driver side airbag based upon identity of driver; storage and recall of seating adjustments; storage and recall mirror adjustments; storage and recall of radio presets; enhanced security based on identity—identified users with proper access could perform the following functions; keyless start; keyless entry; full engine and speed performance; access to secure compartments; access to email or multimedia; users without proper access would be prevented from using vehicle features or would have accessed to a reduced set or lower performance features such as reduced engine performance or limited top speed; reduced or no access to email/multimedia.

Automotive Spectroscopic Sensors

Applications of the present invention are grouped into the following categories: wellness/driver condition which helps maintain driver wellbeing, driver identification which recognize the driver (or passenger) to enhance interaction with the vehicle and services offered through the vehicle, automotive sensors which improve the performance and functionality of automobiles, safer, better driving which helps the driver drive better and more easily, automotive lifecycle which contributes to the development, manufacture, marketing, service/repair and recycling of vehicles, acoustic application which apply the present algorithms to acoustic spectra.

Wellness/Driver Condition

First aid telemetry link provides medical data to remote physician/assistant surgeon. Medication reminder prompts driver to take heart or asthma drugs. Glucose OK-to-drive check checks at start and during journey. Alcohol OK-to-drive check checks before setting off on journey. Drugs OK-to-drive check, checks before setting off on journey. Tie to "med alert" rescue feature.

Driver attention checks how safely and effectively driver is performing. Interior air quality monitors temperature, humidity, air quality and links to air conditioner settings. Driver drowsiness monitors state of alertness and sets alarm to warn driver. Driver stress monitors driver and offers advice/adapts car characteristics. Information overload manages information presentation to driver to avoid distraction. Driver heart condition measures pulse. Driver heart condition measures blood pressure.

Driver Identification

Passive entry enables driver to unlock vehicle without taking out a key. Vehicle start enables driver to start vehicle without taking out a key. Personality activation configures vehicle (seats, mirrors, etc.) to individual. Airbag deployment maximizes airbag effectiveness for individual. Electronic toll automatically adjust charge according to e.g. person, journey. Driver license identification confirms driver identity to authorize groups/maintain privacy. Web security enables driver to carry out secure Web transactions.

Automotive Sensors

Battery state of charge. Fuel cell control manages fuel reformation and fuel cell performance. Combustion control manages combustion process in cylinder. Fuel mixture ensures that he correct fuel mixture is fed to the engine. Fuel quality control checks fuel quality during filling. Exhaust emissions monitors gases e.g. to comply with OBD II. Tire wear indicator surface dye, or dye stratum, wears away. Vehicle fluid condition monitor checks e.g. oil, water, antifreeze, wiper fluid. Brake diagnostics check for wear and overheating. Light bulb ageing (filament and discharge). Optical bus interrogates distributed sensors. X-to-optical transducers optical interrogation of sensors for T, pressure, strain, shape, slip . . . Display illumination sensor checks ambient illumination to ensure that instruments are legible. Feedback for smart powertrain avoids engine damage and optimizes shifting.

Safer, Better Driving

Auto de-mist/de-ice checks visibility through windows. Lighting conditions checks road illumination and ease of driving. Road surface check warns of ice or risk of aquaplanning. Weather conditions check local weather (e.g. rain/snow) and prepare vehicle/driver. Crash decision making make better assessments of vehicle and occupant readiness. Traction control sensor detects vehicle true motion with respect to road. Fire detection enables early detection of vehicle fires.

Automotive Lifecycle

Gather customer information non-intrusive market research or targeting support services. Parts recycling/counterfeit prevention label parts to assure genuine identity or stop grey marketing. Environmental degradation detect impending component failure, especially on older vehicles. Paint matching ensure better quality vehicle repair. Illegal wreck restoration stop written-off vehicles being integrated ("cut and shut"). Metrology systems in manufacture. ID for plug-and-play recognize systems for vehicle upgrades/repairs. Coding production parts allows compact, low-cost storage of data. Non-destruction testing and quality assurance.

Acoustic Applications

Algorithms of the present invention to acoustic spectra for: NVH diagnostics, intruder detection, power-train diagnostics and management, tire wear, predictive maintenance, hi-fi spectral compensation, road traffic analysis (traffic phase identification).

Car Information Node Application

In an aspect of the present invention a user's identity is confirmed (authenticated) to allow access to an in-car information system. For example, ID confirmation could allow access to specific Internet websites or wireless information systems such as financial services etc., or access to corporate or personal networks.

In operation, the user would first present some form of identification, the new technology would then authenticate that the user really is who they claim to be. Identification could be by card swipe, mechanical key, RF tag, etc. Ideally, the authentication step would be transparent to the user (either occurring simultaneously with identification or as part of normal vehicle operation, like touching a control).

An added capability of the present invention is that it is able to measure blood alcohol levels at the same time as authenticating identify. This could provide a "fit-to-drive" indication. Measuring alcohol and identify simultaneously makes the system more robust against deception.

Automotive Embodiments

Noninvasive measurement capability has numerous applications in an automobile, for instance securing information node, Ok-to-drive monitor, keyless entry, keyless start, driver health assessment, powertrain fluids assessment, and engine performance.

Adjacent Business Opportunities

A small biometric system developed for automotive customers has broad applicability in other business for example, driver license validation, credit card authentication and other financial transactions, workplace time and attendance and alcohol monitoring may play a role here too, and computer and network access.

Risk management system for insurers: verify correct driver is driving vehicle and that they are in a suitable condition to drive. Interlock for children under 21, valets etc.: stops wrong driver, sets vehicle parameters (e.g. speed, acceleration). Track sales-person activity: helps maximize productivity. Water quality (non-automotive applications). Advance notice of likely failure: eases maintenance. Optimize engine performance: for greenness, power. Apply RGMT technology to audio signals e.g. to help vice recognition system distinguish people. Universal auto-fluid diagnostic, samples at many points using fibers and hub: e.g. enables good oil change decisions.

Embed fibers in car, link to external spectrometer (e.g. in garage): enables smarter servicing, tuning, etc. Diagnostics/prognostics of fluids: e.g. for engine oil, transmission, brake, radiator. Differentiate between child and adult: e.g. for airbag. Age (scattering by collagen): e.g. passive vehicle start, accident management. Color matching: for manufacture or accident repair. Body mass (by percent body fat): e.g. for accident management. Driver state of stress: e.g. linked to collision preparation/management.

Person position: helps with accident management—get it for free. Heart rate. Health monitoring of driver e.g. for safety and better medical care: pulse pressure, breath rate ($H_2$) $CO_2$), $O_2$ saturation of blood, and body temperature. Remote medical advice: let driver get help from remote medical staff while still in the car e.g. at accident. "Doc in a box": self-contained smart health guidance for driver. Baby/child monitoring e.g. temperature, $O_2$: avoids injury due to being left in car, or un-noticed illness on long journey.

Detect distractions (e.g. by other occupants): warns driver to pay attention to avoid dangerous driving. Daily health check: detects changes in occupant health and alerts person to see doctor. Preventative maintenance: detects impending failures so they can be repaired conveniently (e.g. for fleet management). Bulb life: detect impending failure. Control information flow to drivers: avoid overloading driver and creating dangerous distractions. Detect driver's level of concentration: helps them drive within capability (for safety) yet make driving more engaging.

Identify and discriminate people, for rental cars: ensure correct driver, for credit card ID: e.g. authorize AmEx payments, internet and/or vehicle security (e.g. passive entry via door glass), etc., right person using the automobile feature. Engine management: enables tighter control e.g. cylinder-by-cylinder monitoring (oxygen, humidity, air-fuel mixture, emissions) and therefore better performance. Exhaust management: enables better catalytic converter maintenance.

Alcohol: confirm that driver is sufficiently sober to drive safely. Other drugs: check if driver (especially of commercial vehicles) is abusing drugs, taking unsafe prescribed drugs, or dangerous levels of otherwise safe drugs. Gasoline octane: confirm fuel meets correct specifications to enable optimal engine function and manage emissions. Driver health: checks alertness, awareness etc. to ensure driver is well enough to drive safety—duplicate concept. Monitor manufacturing process: e.g. checks for hazardous waste, or enables better process control.

Cabin air quality: e.g. checks for oxygen, CO or $CO_2$ (duplicate concept). Detect bacteria potentially harmful to humans (e.g. legionella) in HVAC. Road surface condition monitoring: e.g. distinguish ice and water. Check windscreen transparency: e.g. auto de-mist or de-ice. Detect poor headlight cover transparency e.g. due to soiling: warn driver or clean cover. Cigarette detector: stop car renters smoking when they shouldn't. Set up car for individual driver preferences.

High-Level Operation

At a high level, the BIS system will have the capacity to be configured for either verification (one-to-one) tasks or for identification (one-to-many) tasks. Examples of each type of operation are discussed as appropriate in the cases given below:

Secure Vehicle Information Node (Verification Mode):

Each authorized user of the vehicle is issued an ignition key with a unique transponder code. Initially each authorized user of the secure automotive information node (e.g. ICES accessing personal information such as bank accounts, stock transactions, etc.) has to enroll in the BIS authorization system. This process begins by placing the user-specific key in the ignition switch and then placing a light or other convenient tissue site on the optical access port for a spectral measurement (~10 seconds). The light is removed and replaced for a second optical measurement, which is used to confirm consistency of the enrollment measurement. Upon successful measurement of the fiber, the user is enrolled in the system and can use it at any future time.

In subsequent use, access to the secure information node is achieved by inserting the user-specific key in the ignition and placing the light or other tissue site on the optical access port for a brief measurement (~1 second). If the tissue measurement matches the authorized spectrum corresponding to the key, authorization is granted and the person can access the secure information node. If the tissue of the person attempting to access the information system does not correspond to the authorized individual indicated by the key, the use of the information node is denied.

The system will be versatile enough to perform authentication, using sites other than the enrolled site. Thus, if the index light of the right hand is used for enrollment, all other lights can be used as alternate sites in subsequent use.

In addition to the biometric capabilities, the BIS functionality can also be expanded to provide a rapid, non-invasive assessment of alcohol in the tissue. In this mode of operation, the user simply places his or her light or other tissue site on the optical port for an appropriate number seconds and an assessment of the alcohol level is made. Depending upon the software settings, the device can simply report the estimated alcohol level or, if desired, other more positive actions can be taken based upon the user's ID. For example, if the person being tested is an authorized but underage user of the vehicle, the system could be enabled to automatically place a telephone call to notify the parents or guardians that a significant level of alcohol has been detected.

Biometric ID for Driver's License, Financial Transactions, Workplace (Verification Mode)

The BIS system functionality can be expanded to provide authentication in a large variety of both automotive and non-automotive settings. For example, the system can be used to ensure authenticity of driver's licenses by having each driver enroll in the BIS system when obtaining or renewing a driver's license. The pertinent spectral information can then be encrypted and stored on a magnetic strip on the license. At a later time, the person holding the license can be authenticated by swiping the driver's license in an appropriate reader and comparing this information to a tissue spectrum collected on the holder of the license in a manner very similar to the Secure Vehicle Node case, described previously.

Similarly, BIS authentication can be applied to credit cards, ATM cards and other financial transactions to guard against unauthorized usage. As well, this functionality can also be applied to time-and-attendance applications in the workplace to ensure the identity of people entering and leaving a high-population manufacturing or other work environment. In this setting, the BIS system can also be expanded to provide alcohol measurements, the results of which can be used to enhance workplace safety and employee wellness programs.

Secure Computer and Network Access (Verification Mode)

The BIS system can be used to authenticate users of most computer systems and network nodes in a manner that is very similar to the cases of the Secure Vehicle Information Node. For general use, the means of providing identity can be a typed user name, magnetic card, or other appropriate means (rather than using an individually coded ignition key as in the automotive application). Other than this aspect, the enrollment and authorization operation of the device is nearly identical to the vehicular case.

Secure Vehicle Entry (Identification Mode)

In cases where relatively small numbers of people (1–10) are authorized to use a particular vehicle, the BIS system can be configured to perform in an identification mode with high reliability. This mode of operation is particularly well suited to the application of ensuring authorized entry into a vehicle. In this application, the BIS system may be able to be configured to operate through an appropriate portion of the automotive glass (e.g. side windows). As with the case of the Secure Vehicle Information Node, each authorized user will have to participate in a brief enrollment session before using the system. Then, in subsequent use, the authorized user will touch the glass or other optical access port to gain entry into the vehicle without providing any other form of identification. An additional feature of this form of security is that upon authorization, the system will be able to establish which of the authorized users is entering the vehicle and be able to provide this information to other automotive subsystems (e.g., safety, personality setting, etc).

If desired, the Secure Vehicle Entry system can be dynamically reconfigured to authorize different users at different times. This feature could have applicability for fleet vehicles such as rental cars, construction vehicles, municipal vehicles, etc. In the case where only a single person is authorized to use such a particular vehicle at any one time, the performance of the BIS system operating in an identification mode would be equivalent to its performance as a verification device.

As any person skilled in the art of biometric detection as applied to the identification of vehicle occupants will recognize from the previous detailed description and from the figures, modifications and changes can be made to the preferred embodiments of the invention.

What is claimed is:

1. A method for detecting an identity of an occupant of a vehicle, the method comprising:

determining whether a first switch has been activated:

activating a vehicle occupant identification system, if the first switch has been activated;

acquiring an image of a member of the vehicle occupant;

prompting the vehicle occupant to remove the member from the occupant identification system;

enrolling the occupant of the vehicle as a user of the vehicle identification system by creating an image template indicative of the identity of the user;

determining whether the acquired image of the user has a predetermined level or image quality;

comparing the acquired image of the member with at least one stored image template of a member;

determining whether the acquired image of the member matches the at least one stored image template;

assessing whether the vehicle occupant has been identified;

determining whether a second switch has been activated; and deactivating the vehicle occupant identification system if the second switch has been activated.

2. The method of claim 1 wherein activating a vehicle occupant identification system further comprises determining whether an occupant identification sensor has been activated.

3. The method of claim 1 wherein activating a vehicle occupant identification system further comprises activating the system using a controller area network.

4. The method of claim 1 wherein acquiring an image of a member further comprises entering an active mode of the vehicle occupant identification system.

5. The method of claim 1 further comprising entering a sleep mode of the vehicle occupant identification system after the vehicle occupant has been identified.

6. The method of claim 1 wherein the member of the vehicle occupant is a finger of the vehicle occupant.

7. The method of claim 1 wherein acquiring an image further comprises determining whether an engine of the vehicle is running.

8. The method of claim 1 wherein enrolling a vehicle occupant further comprises receiving an administrator code to identify the vehicle occupant.

9. The method of claim 1 wherein enrolling a vehicle occupant further comprises selecting a primary finger to enroll.

10. The method of claim 1 wherein enrolling a vehicle occupant further comprises determining whether the occupant identification sensor has been activated.

11. The method of claim 1 wherein enrolling a vehicle occupant further comprises assigning an identification number to an image template.

12. The method of claim 1 further comprising erasing a user of the vehicle occupant identification system.

13. The method of claim 12 wherein erasing a user further comprises determining whether an administrator code is correct.

14. The method of claim 12 wherein erasing a user further comprises erasing a image template indicative of an identity of a user.

15. A system for detecting an identity of an occupant of a vehicle, the system comprising:

a module mounted in the vehicle, wherein the module includes:

a biometric sensor mounted in the module for acquiring an image of a member of the vehicle occupant; and a first tactile switch in communication with the a biometric sensor for sensing the presence of the member of the vehicle occupant on the biometric sensor; and a second tactile switch for deactivating the system after the image has been acquired; and a processor in communication with the module for analyzing the image of the member of the vehicle occupant to determine the identity of the occupant.

16. The system of claim 15 wherein the module further comprising light emitting diodes for illuminating an area around the biometric sensor.

17. The system of claim 15 further comprising a cover for enclosing the module wherein the cover has a wall for guiding the member of the occupant towards the biometric sensor.

* * * * *

UNITED STATES PATENT AND TRADEMARK OFFICE
CERTIFICATE OF CORRECTION

PATENT NO. : 6,810,309 B2
DATED : October 26, 2004
INVENTOR(S) : John G. Sadler et al.

It is certified that error appears in the above-identified patent and that said Letters Patent is hereby corrected as shown below:

Column 16,
Line 38, after "communication with the" delete "a".

Signed and Sealed this

First Day of March, 2005

JON W. DUDAS
*Director of the United States Patent and Trademark Office*